(12) United States Patent
Hill

(10) Patent No.: US 8,217,300 B2
(45) Date of Patent: Jul. 10, 2012

(54) LASER WELDED FASTENERS

(75) Inventor: John E. Hill, Shelby Township, MI (US)

(73) Assignee: Magna International Inc., Aurora, Ontario (CA)

( * ) Notice: Subject to any disclaimer, the term of this patent is extended or adjusted under 35 U.S.C. 154(b) by 429 days.

(21) Appl. No.: 12/477,323

(22) Filed: Jun. 3, 2009

(65) Prior Publication Data
US 2009/0308850 A1   Dec. 17, 2009

Related U.S. Application Data

(60) Provisional application No. 61/061,152, filed on Jun. 13, 2008.

(51) Int. Cl.
*B23K 26/00* (2006.01)

(52) U.S. Cl. .......... 219/121.64; 219/121.63; 219/121.66

(58) Field of Classification Search ............. 219/121.64, 219/121.66, 121.65, 121.85; 296/146.5, 296/146.6; 49/501, 502, 503; 428/52
See application file for complete search history.

(56) References Cited

U.S. PATENT DOCUMENTS

| | | | |
|---|---|---|---|
| 2,707,507 A | 5/1955 | Tripp et al. | |
| 2,908,310 A | 10/1959 | Grey | |
| 3,199,566 A | 8/1965 | Dyka | |
| 3,910,331 A * | 10/1975 | Randall | ........................ 411/181 |
| 4,916,284 A | 4/1990 | Petrick | |
| 5,115,115 A * | 5/1992 | Alborante | ................ 219/121.63 |
| 5,626,776 A | 5/1997 | Morris, Jr. | |
| 5,897,796 A * | 4/1999 | Forrest | ..................... 219/121.64 |
| 6,227,433 B1 | 5/2001 | Waldron et al. | |
| 6,693,254 B2 * | 2/2004 | Menin | ...................... 219/121.63 |
| 6,755,601 B2 | 6/2004 | Ohta | |
| 6,794,603 B1 | 9/2004 | Musselman | |
| 6,908,272 B2 | 6/2005 | Nilsen et al. | |
| 6,935,823 B2 | 8/2005 | Mitts et al. | |
| 7,125,067 B2 * | 10/2006 | Bonnett et al. | ............. 296/146.6 |
| 7,144,064 B2 * | 12/2006 | Azzouz et al. | ............. 296/146.1 |
| 7,255,521 B2 | 8/2007 | Yake et al. | |
| 2006/0266798 A1 | 11/2006 | Menon et al. | |
| 2006/0291974 A1 * | 12/2006 | McGee et al. | ................ 411/171 |
| 2007/0092354 A1 | 4/2007 | Nilsen et al. | |
| 2007/0295698 A1 | 12/2007 | Hengel et al. | |
| 2008/0193255 A1 | 8/2008 | Hengel et al. | |
| 2008/0289143 A1 | 11/2008 | Lu | |
| 2009/0121515 A1 * | 5/2009 | Shiono et al. | .............. 296/146.6 |

* cited by examiner

*Primary Examiner* — M. Alexandra Elve
(74) *Attorney, Agent, or Firm* — Dickinson Wright PLLC

(57) ABSTRACT

A method of manufacturing a vehicle structure including a laser welded fastener includes positioning a first panel in engagement with a second panel to provide access to the first panel by a laser beam. The first panel is laser welded to the second panel. A fastener including projections axially extending from a first surface of a flange are formed. The projections are engaged with a surface of the first panel to space apart the first surface of the flange from the surface of the first panel. Laser welding is initiated by directing a laser beam toward one of the flange of the fastener and the first panel. Gas is vented from an area between the first surface of the flange and the surface of the first panel. The flange is laser welded to the first panel.

21 Claims, 5 Drawing Sheets

LASER WELDED FASTENERS

This application claims the benefits of the U.S. Provisional Application No. 61/061,152, filed Jun. 13, 2008.

FIELD

The present disclosure generally relates to laser welded automotive components. More particularly, a welded structure and method of laser welding fasteners to the laser welded structure is defined.

BACKGROUND

Automotive body panels are typically constructed from a number of separately stamped metal sheets. For example, vehicle doors may include a stamped outer panel fixed to a stamped inner panel to define a door shell. At least one known door shell includes an outer panel spot welded to an inner panel at a number of locations along the outer periphery of the assembly. A spot welding process typically occurs in a dedicated work cell performing only inner panel to outer panel spot welding. Subsequently, the door shell is transferred to one or more stations where fasteners are attached to the inner panel. Conversely, the inner panel may be first transferred to a station where fasteners are coupled to the inner panel and then the inner panel including the fasteners is moved to the welding station for interconnection with the outer panel as previously described.

The requirement for multiple workstations and multiple sets of tooling greatly increases the cost and time required to manufacture a vehicle component. Depending on the method used to attach the fasteners, difficulties may arise in providing access to the tooling to assure proper fastener mounting. For example, a tubular member may require machining to provide apertures allowing access for electrodes on one side of a resistance welded joint. The additional machining and mechanical strength degradation may be undesirable.

Furthermore, other fasteners may require relatively large amounts of energy over an extended period of time to provide a desired joint strength. One example includes attempting to laser weld nuts having relatively large thicknesses equal to the length of a threaded aperture of the fastener. The time and energy required to couple the thick fastener may be prohibitive.

Attempts to couple mechanical fasteners to sheet steel via a laser welding process have been challenging. To prevent corrosion of the fastener and/or the substrate, a galvanized coating is often used. One known welding attempt includes providing a fastener having a substantially smooth planar surface abutting a substantially smooth planar surface of a galvanized substrate. During the laser welding process, the galvanized coating boils and zinc gas is emitted. The zinc gas is temporarily trapped between the substantially smooth planar surfaces of the fastener and the substrate until sufficient energy is gained for the gas to escape. Parent material of the substrate and/or the fastener may be ejected based on the pressure and energy provided from the zinc gas. After the parent material is ejected, undesirable porosity or holes are formed requiring the assembly to be scrapped or reworked. If ejection of the parent material does not occur, the weld may be otherwise negatively affected due to the presence of the zinc gas. Accordingly, a need exists in the art to provide improved laser welding methods and laser welded products.

SUMMARY

A method of manufacturing a vehicle structure including a laser welded fastener includes providing a first panel and a second panel to be joined to one another, where the first panel having a predetermined thickness. A thickness of a flange of a fastener to be welded to the first panel is determined based on the thickness of the first panel. Projections axially extending from a first surface of the flange are formed. The method also includes positioning the first panel in engagement with the second panel to provide access to the first panel by a laser beam. The first panel is laser welded to the second panel. The projections are engaged with a surface of the first panel to space apart the first surface of the flange from the surface of the first panel. Laser welding is initiated by directing a laser beam toward one of the flange of the fastener and the first panel. Gas is vented from an area between the first surface of the flange and the surface of the first panel. The flange is laser welded to the first panel at a location spaced apart from the projections.

Additionally, a method of manufacturing a vehicle structure including a laser welded fastener includes providing a panel having a predetermined thickness and an aperture extending through the thickness. A fastener having a threaded portion, a radially outwardly extending flange and a projection axially extending from a first surface of the flange is formed. The threaded portion of the fastener is aligned with the panel aperture. The projection is engaged with a surface of the panel to space apart the first surface of the flange from the surface of the panel. Laser welding is initiated by directing a laser beam toward one of the flange of the fastener and the panel. Gas is vented from an area between the first surface of the flange and the surface of the panel. The flange is laser welded to the panel at a location spaced apart from the projection.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
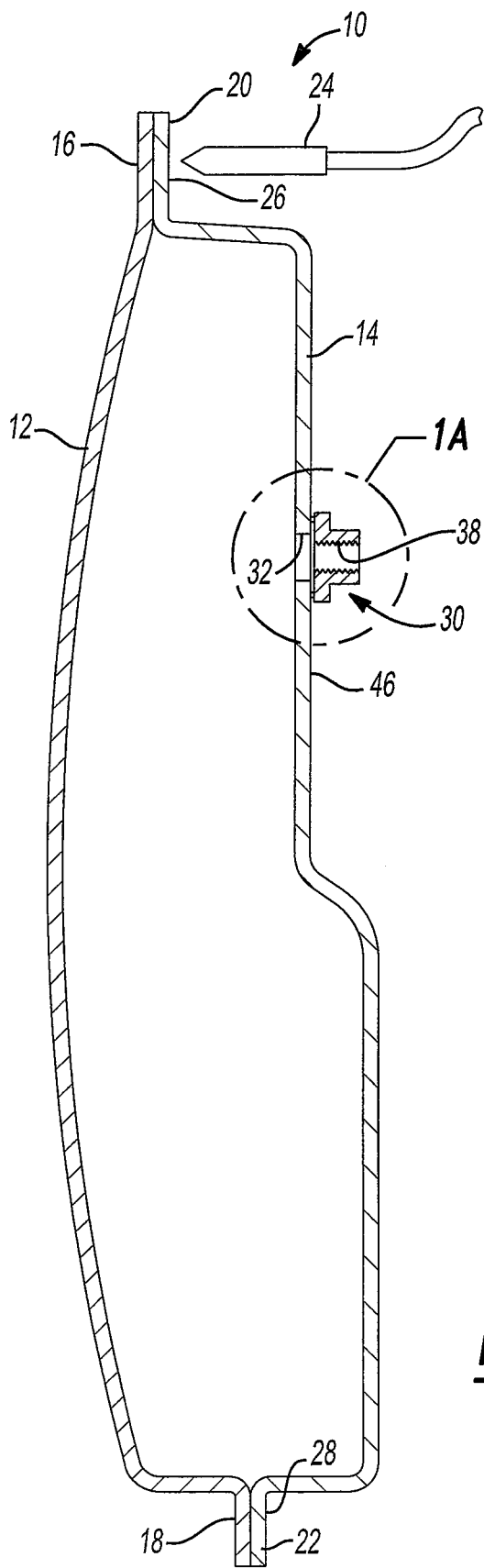
FIG. 1 is a cross-sectional view of an exemplary laser welded vehicle structure including a laser welded fastener.
Figure 1A:
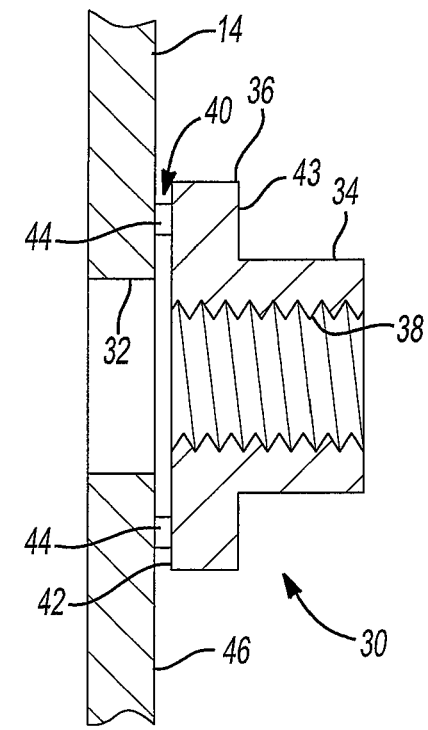
FIG. 1A is an enlarged view of a portion of FIG. 1.

The following description is merely exemplary in nature and is not intended to limit the present disclosure, application, or uses. It should be understood that throughout the drawings, corresponding reference numerals indicate like or corresponding parts and features.

With reference to FIG. 1, an exemplary laser welded door is identified at reference numeral 10. It should be appreciated that door 10 is merely exemplary and that any number of laser welded structures may be constructed in accordance with the teachings of the present disclosure. Door 10 includes a stamped outer panel 12 and a stamped inner panel 14. Outer panel 12 includes a first upper flange 16 and a first lower flange 18. Inner panel 14 includes a second upper flange 20 and a second lower flange 22. Outer panel 12 and inner panel 14 are formed independently from one another and subsequently positioned in a laser welding workstation as shown in FIG. 1. Once outer panel 12 is positioned relative to inner panel 14 in the desired location, a laser weld is formed by emitting a beam from a laser 24. The laser welding is accomplished by positioning laser 24 proximate an outer surface 26 of second upper flange 20. In similar fashion, second lower flange 22 is laser welded to first lower flange 18 by directing a beam emitted from laser 24 at an outer surface 28 of second lower flange 22.

In the same work cell, a fastener 30 is fixed to inner panel 14. This process is accomplished by first positioning fastener 30 in alignment with an aperture 32 extending through inner panel 14. In the example shown in FIG. 1, fastener 30 is a threaded nut including a cylindrically shaped body 34 and a radially extending flange 36. A threaded bore 38 extends through body 34 and flange 36. Threaded bore 38 is positioned in alignment with aperture 32 such that an externally threaded fastener (not shown) may be engaged with threaded bore 38 and extend through inner panel aperture 32.

Figure 2:
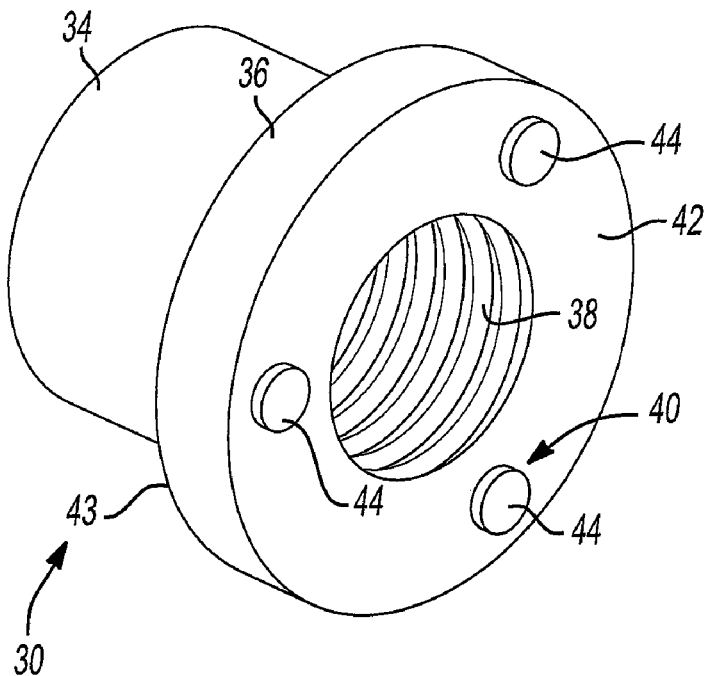
FIG. 2 is a perspective view of a fastener prior to laser welding.

As shown in FIG. 2, a plurality of projections 40 axially extend from a first surface 42 of flange 36. Flange 36 includes an opposite surface 43. Projections 40 are substantially cylindrically shaped and circumferentially spaced apart from one another. Each projection 40 includes an end face 44 spaced apart from surface 42 a common distance. Each projection 40 is relatively small such that each end face 44 functions to provide substantially point contact with an outer surface 46 of inner panel 14. As such, projections 40 define a plane on which fastener 30 contacts inner panel 14. Projections 40 may be alternatively shaped as hemispheres, cones or any other suitable shape.

It should be noted that projections 40 assure that a space exists between surface 42 of fastener 30 and surface 46 of inner panel 14 prior to laser welding. Projections 40 do not provide electrical pathways for current to flow during welding. Laser welding of flange 36 to inner panel 14 occurs at locations other than through projections 40. As such, the spacing between surface 42 and surface 46 is minimized to facilitate robust laser welding. On the other hand, projections 40 must extend a distance sufficient to allow gaseous zinc to escape from the galvanized surface of inner panel 14 and/or fastener 30 during laser welding. It has been found through experimental testing that a spacing of approximately 0.1 mm between surface 42 and surface 46 meets these opposing concerns.

Figure 3:
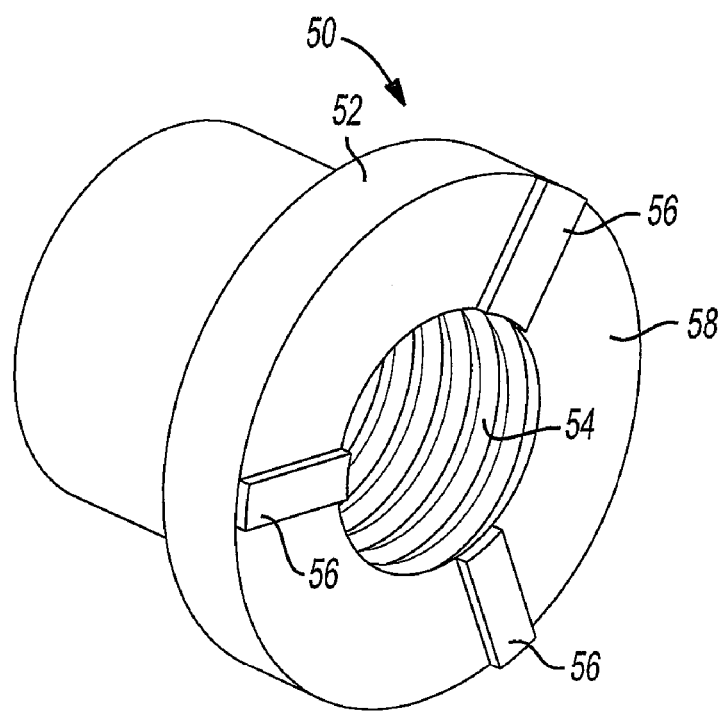
FIG. 3 is a perspective view of an alternate fastener having radially extending ribs axially protruding from a flange.

FIG. 3 depicts an alternative fastener 50 having a flange 52 radially extending from threaded central aperture 54. A plurality of radially extending projections 56 axially extend from a surface 58 of flange 52. Projections 56 may be shaped as ribs having substantially constant or varying thickness in lieu of the projections 40 previously described. Projections 56 perform the same function as projections 40 in that they space surface 58 of fastener 50 from surface 46 of inner panel 14 to allow gas to escape from between the surfaces during the laser welding process.

Figure 4:
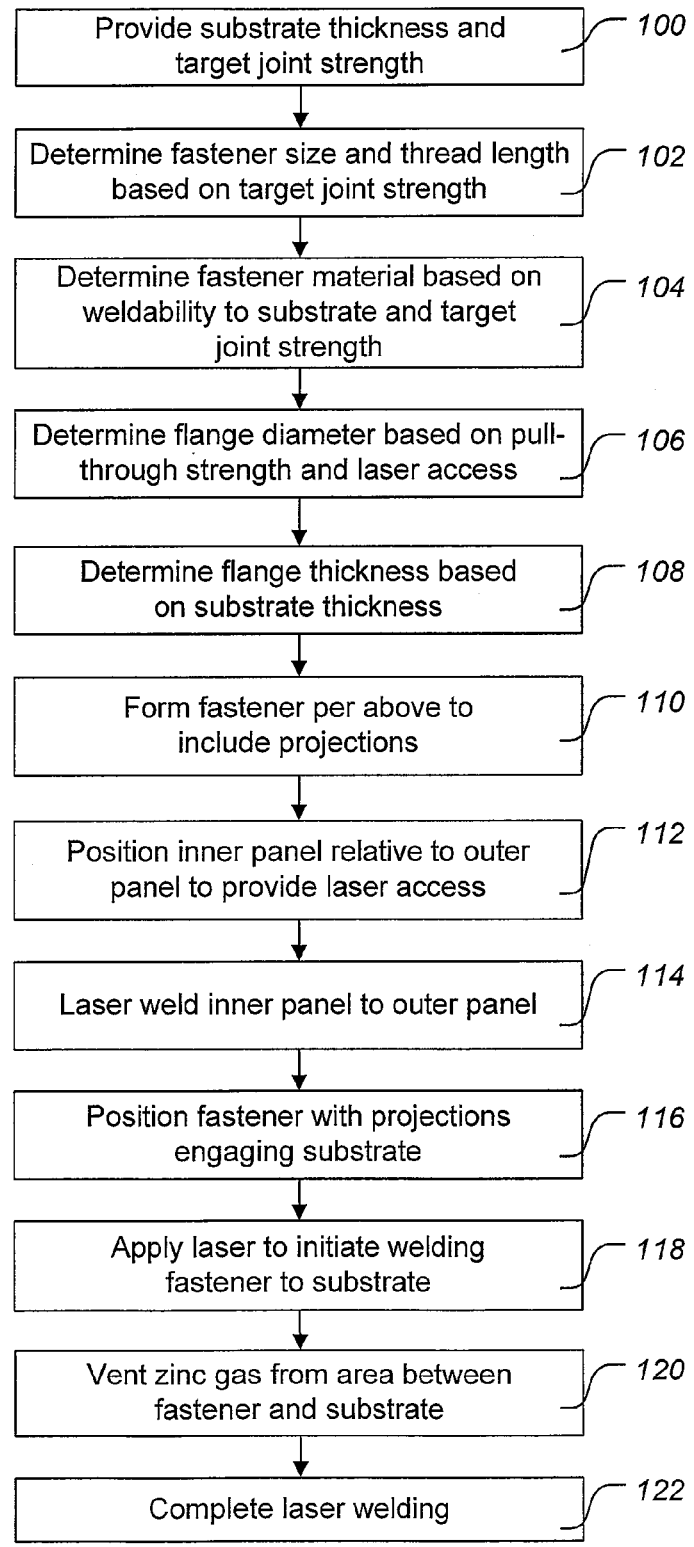
FIG. 4 is a flow chart depicting a method of laser welding an automotive component.

The work cell for assembling door 10 is configured to reliably and quickly laser weld outer panel 12 to inner panel 14 as well as laser weld at least one fastener 30 to inner panel 14 or any other panel that may be subsequently laser welded to outer panel 12 or inner panel 14. This goal may be accomplished by implementing a process of properly configuring fastener 30, outer panel 12 and inner panel 14 as defined in the flow chart presented in FIG. 4. To minimize the time required to weld the various components to one another, fastener 30 is optimized in size, shape and material to cooperate with the substrate to which it is being laser welded. In this instance, fastener 30 is laser welded to inner panel 14. The process begins at block 100 where a thickness of the substrate or inner panel 14, and a target joint strength are provided. At block 102, the size and thread length, if applicable, of fastener 30 are determined based on target joint strength. For example, a known joint clamp load may be desired to be provided to mount an accessory to inner panel 14. Accordingly, a fastener grade and diameter may be selected based on the target joint strength. A minimum thread engagement may also be determined and used to determine the thread length of threaded bore 38. The length of the threaded body portion may also be determined by calculating a length necessary to minimize the likelihood of the spatter produced by the laser welding process from contacting the threads.

At block 104, the material used to construct fastener 30 is determined based on weldability to the substrate as well as the target joint strength. At block 106, the outer diameter of flange 36 is determined based on a predetermined pull-through strength for the joint. The pull-through strength relates to an amount of force required to pull fastener 30 through inner panel 14. As the diameter of flange 36 increases, so does the pull-through strength. The flange diameter determination may also be based on providing adequate access for the laser. As the flange diameter increases, the angle or weld access view point, at which the laser beam may be applied also increases. Movement of the laser beam may be minimized or clear access to the flange may be provided by increasing the flange diameter.

At block 108, a thickness of flange 36 is determined based on the thickness of the substrate. A robust laser weld between flange 36 and inner panel 14 may be produced in a time efficient manner by forming the thickness of flange 36 to be substantially the same as the thickness of inner panel 14 at the location of the laser weld. Other thicknesses may also be used to provide the target joint strength. However, flange thicknesses substantially exceeding the thickness of the substrate will require more time and energy to weld through the fastener flange and produce a satisfactory laser weld.

Block 110 provides the step of forming fastener 30 per the characteristics previously determined as well as forming projections 40 axially extending from flange 36. At this time, the geometry of fastener 30 is defined.

At block 112, inner panel 14 is positioned relative to outer panel 12 such that second upper flange 20 engages first upper flange 16. Second lower flange 22 also engages first lower flange 18. Outer panel 12 and inner panel 14 are oriented within the work cell to provide access to inner surfaces 26 and 28 by laser 24. At block 114, outer panel 12 is laser welded to inner panel 14 along the pair of upper flanges as well as the pair of lower flanges previously described.

Fastener 30 is positioned to engage projections 40 with outer surface 46 of inner panel 14 at step 116. Optimally, outer panel 12 and inner panel 14 will not be translated, rotated or otherwise moved from their previous positions when the upper and lower flanges were welded to one another. In this manner, accurate positioning is maintained, extra transfer tooling is not required, and no time is spent in transferring or repositioning the substrate prior to laser welding fastener 30 thereto. It should be appreciated that the positioning step defined in block 116 may be achieved by placing fastener 30 over a pin aligning threaded bore 38 with aperture 32. Because electrical current does not pass through projections 40, a clamping load need not be imparted to assure that proper electrical pathways exists such as prior to resistance welding. On the contrary, the present method not only reliably and quickly secures fastener 30 to inner panel 14, but does so without deforming inner panel 14 via previously known crimping or clamping methods such as known in the resistance welding art.

At block 118, a laser beam emitted from laser 24 is directed to surface 43 of flange 36 to initiate laser welding fastener 30 to inner panel 14. At block 120, zinc gas is vented from the area between surface 42 and surface 46 through the vent passages defined by projections 40. At block 122, laser welding of fastener 30 to inner panel 14 is completed by directing the beam emitted from laser 24 along a predetermined path on surface 43 of flange 36. It should be appreciated that the laser may be intermittently powered to provide a number of spaced apart laser welds. Alternatively, the laser may be continuously powered such that an uninterrupted ring-shaped weld is formed between flange 36 and inner panel 14.

Figure 5:
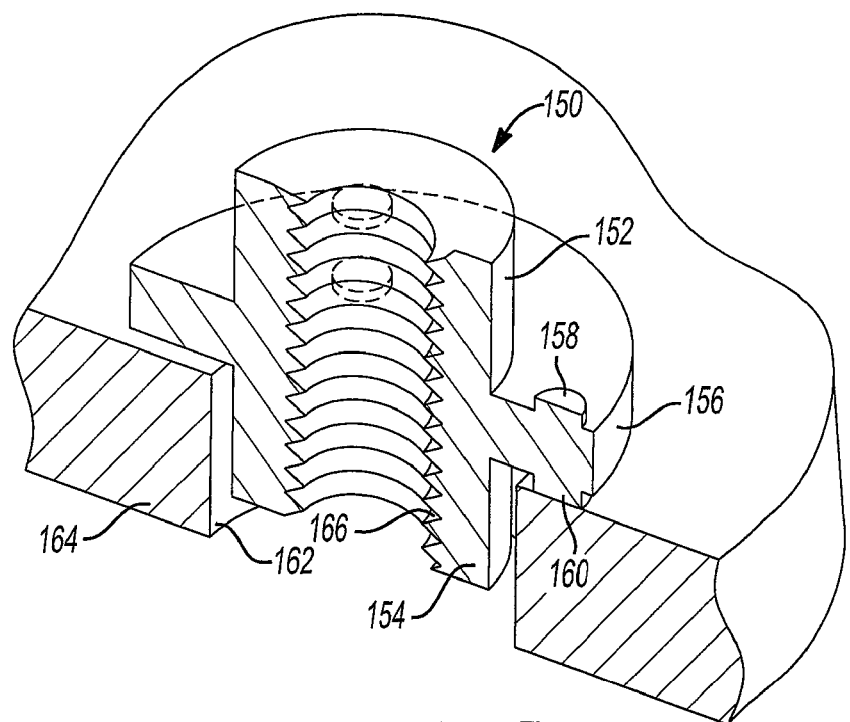
FIG. 5 is a fragmentary cross-sectional perspective view of an alternate fastener positioned for laser welding to a substrate.

FIG. 5 depicts an alternate fastener 150 having a first cylindrical body portion 152 and a second cylindrical body portion 154 extending in opposite directions from a central flange 156. A first plurality of projections 158 axially extend from flange 156 in the same direction as first body portion 152. A second plurality of projections 160 axially extend from flange 156 in an opposite direction. Fastener 150 is symmetrically formed such that second body portion 154 or first body portion 152 may be positioned within an aperture 162 formed in a substrate 164. This arrangement provides an increased length for a threaded bore 166 extending through fastener 150.

Figure 6:
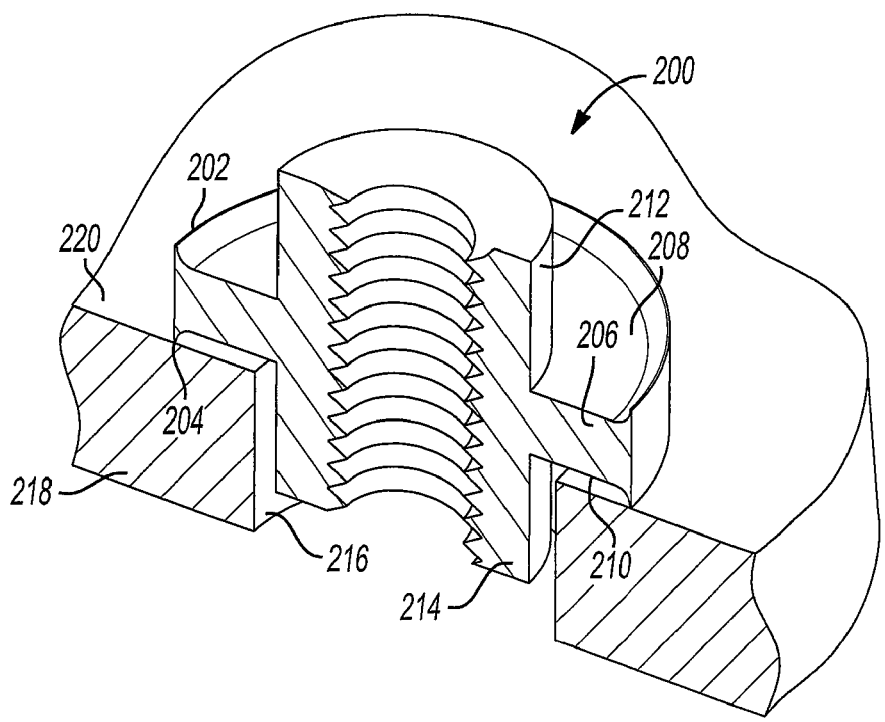
FIG. 6 is a fragmentary cross-sectional perspective view of an alternate fastener positioned for laser welding to a substrate.

FIG. 6 provides another alternate fastener identified at reference numeral 200. Fastener 200 is substantially similar to fastener 150 except that projections 158 and 160 are replaced with substantially continuous circumferentially extending rims 202, 204. Rim 202 is formed at the perimeter of a flange 206 and axially extends from a first surface 208 of flange 206. In similar fashion, rim 204 is formed at the outer circumferential limit of flange 206 and axially extends from a second opposite surface 210 of flange 206. Rims 202 and 204 may be simultaneously formed during a cold heading or roll forming operation. Each of a first body portion 212, flange 206, a second body portion 214, rim 202 and rim 204 are integrally formed with one another as one piece. Fastener 200 is also symmetrical such that either of first body portion 212 or second body portion 214 may be positioned within an aperture 216 extending through a substrate 218. Rims 202, 204 also function to form a seal between fastener 200 and a surface 220 of substrate 218. The laser weld may form a hermetic seal. A leak proof joint results. During laser welding, zing gas escapes from between surface 210 and surface 220 through a gap formed between second body portion 214 and the walls of aperture 216 in which fastener 200 is positioned.

Figure 7:
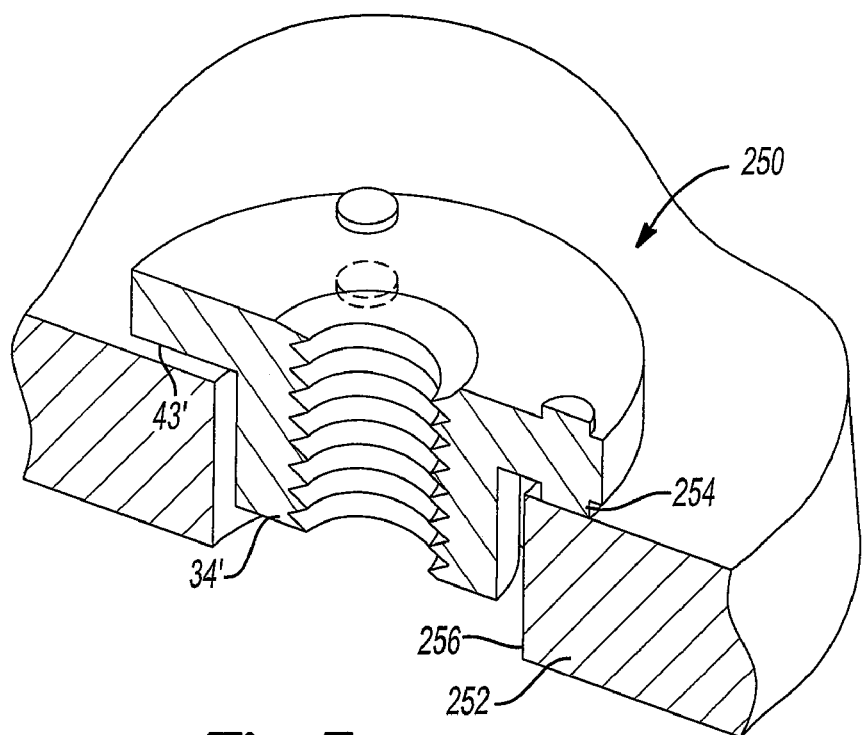
FIG. 7 is a fragmentary cross-sectional perspective view of an alternate fastener positioned for laser welding to a substrate.

FIG. 7 provides another alternate fastener 250 laser to be welded to a substrate 252. Fastener 250 is substantially similar to fastener 30 previously described. As such, like elements will retain their previously introduced reference numerals including a prime suffix. Fastener 250 differs from fastener 30 in that another set of projections 254 axially extend from surface 43'. By positioning projections 254 at this location, fastener 250 may be inverted relative to substrate 252 such that body 34' is positioned within an aperture 256 extending through substrate 252. Fastener 250 may also be positioned in a non-inverted fashion as shown in FIG. 1 if desired.

Figure 8:
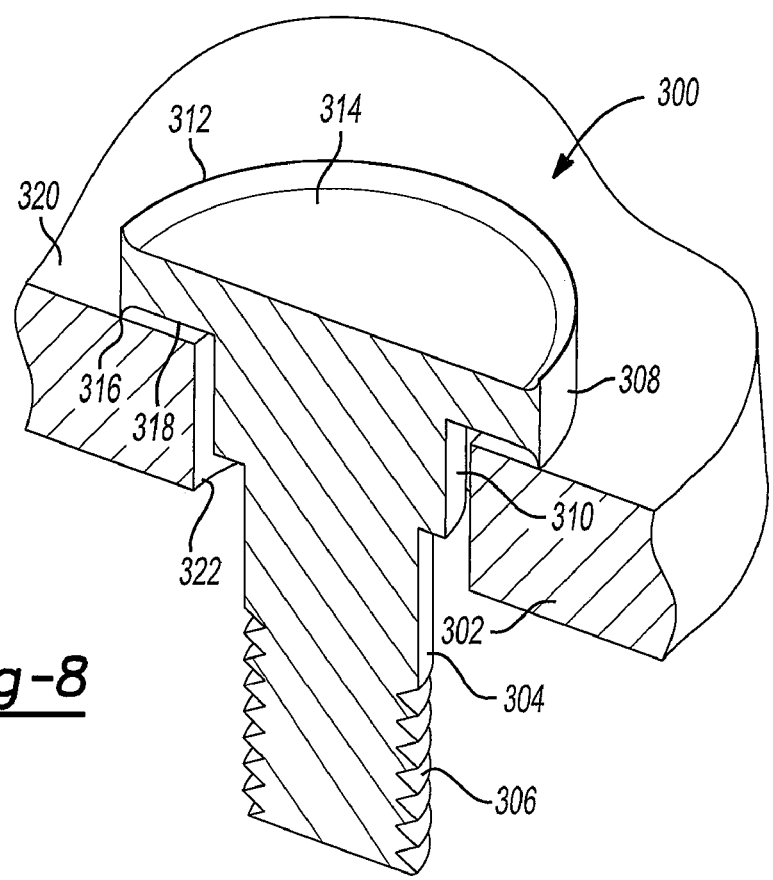
FIG. 8 is a fragmentary cross-sectional perspective view of an alternate fastener positioned for laser welding to a substrate.

FIG. 8 shows an externally threaded fastener 300 for laser welding to a substrate 302. Fastener 300 is shaped as a cap screw having a shank 304 with a threaded portion 306. A radially enlarged head 308 is integrally formed with shank 304. A stepped shoulder 310 may or may not be present. A first uninterrupted circumferential rim 312 axially extends from a surface 314 of head 308. A second uninterrupted circumferentially extending rim 316 axially extends from a surface 318 of head 308. Rims 312, 316 may be formed by rolling or peening operations. Due to the presence of rim 312 and rim 316, fastener 300 may be laser welded to substrate 302 in the orientation depicted in FIG. 8 or may alternatively be inverted such that surface 314 of head 308 is laser welded to a surface 320 of substrate 302. During laser welding, zing gas escapes from between surface 318 and surface 320 through a gap formed between shank 304 and the walls of an aperture 322 in which fastener 300 is positioned.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of manufacturing a vehicle structure including a laser welded fastener, the method comprising:
    providing a first panel and a second panel to be joined to one another, the first panel having a predetermined thickness;
    determining a thickness of a flange of a fastener to be welded to the first panel based on the thickness of the first panel;
    forming projections axially extending from a first surface of the flange;
    positioning the first panel in engagement with the second panel to provide access to the first panel by a laser beam;
    laser welding the first panel to the second panel;
    engaging the projections with a surface of the first panel to space apart the first surface of the flange from the surface of the first panel;
    initiating laser welding by directing a laser beam toward one of the flange of the fastener and the first panel;
    venting gas from an area between the first surface of the flange and the surface of the first panel; and
    laser welding the flange to the first panel at a location on the flange spaced apart from the projections.

2. The method of claim 1 further including providing a target joint strength and determining a size of a threaded portion of the fastener based on the target joint strength.

3. The method of claim 2 further including determining a fastener material based on weldability of the flange to the first panel and the target joint strength.

4. The method of claim 3 further including determining a flange diameter of the fastener based on the target joint strength and a weld access view point of the laser.

5. The method of claim 1 further including circumferentially spacing apart three projections along a plane contacting the surface of the panel.

6. The method of claim 1 further including laser welding the fastener to the first panel without moving the first and second panels from the location where the first and second panels were laser welded to one another.

7. The method of claim 1 wherein a single common laser performs the welding of the first and second panels to one another as well as the welding of the fastener to the first panel.

8. The method of claim 7 wherein the laser welding of the fastener to the first panel is performed without moving the first panel from a position at which the first panel was welded to the second panel.

9. The method of claim 1 wherein forming projections includes positioning a plurality of radially extending ribs on the flange.

10. The method of claim 1 wherein forming projections includes positioning a plurality of axially extending and circumferentially spaced apart cylinders on the flange.

11. The method of claim 1 wherein the first panel includes a vehicle door inner panel and the second panel includes a vehicle door outer panel, each door panel having a flange laser welded to one another.

12. The method of claim 1 wherein the fastener flange thickness is substantially the same as the predetermined thickness of the first panel.

13. The method of claim 1 wherein electrical current is not passed through the projections during welding.

14. The method of claim 1 further including integrally forming a cylindrically shaped body, the flange and the projections of the fastener with one another.

15. The method of claim 1 wherein forming projections includes forming an uninterrupted and axially extending ring on the flange.

16. The method of claim 15 further including forming a sealed joint between the ring and the first panel during laser welding.

17. The method of claim 1 further including positioning a portion of the fastener within an aperture formed in the first panel.

18. The method of claim 1 wherein the projections extend from the first surface of the flange about 0.1 mm.

19. A method of manufacturing a vehicle structure including a laser welded fastener, the method comprising:
  providing a panel having a predetermined thickness and an aperture extending through the thickness;
  forming a fastener having a threaded portion, a radially outwardly extending flange and a projection axially extending from a first surface of said flange a cylindrically shaped body at least partially extending from a second surface of said flange and wherein said first and second surfaces form opposing sides of said flange;
  aligning the threaded portion with the panel aperture;
  engaging the projection with a surface of the panel to space apart the first surface of the flange from the surface of the panel;
  initiating laser welding by directing a laser beam toward one of the flange of the fastener and the panel;
  venting gas from an area between the first surface of the flange and the surface of the panel; and
  laser welding the flange to the panel.

20. The method of claim 19 further including determining a thickness of the flange of the fastener based on the thickness of the panel.

21. The method of claim 19 wherein said second surface includes a second axially extending projection, and said fastener further includes a second body portion extending axially from said flange.

* * * * *